United States Patent
Bandera et al.

(10) Patent No.: US 6,676,395 B2
(45) Date of Patent: Jan. 13, 2004

(54) EQUIPMENT FOR EXTRUDING AN EXPANDED POLYMER SHEET OR PLATE

(75) Inventors: Franco Bandera, Busto Arsizio (IT); Enrico Venegoni, Busto Arsizio (IT)

(73) Assignee: Costruzioni Meccaniche Luigi Bandera S.p.A., Busto Arsizio-Varese (IT)

( * ) Notice: Subject to any disclaimer, the term of this patent is extended or adjusted under 35 U.S.C. 154(b) by 25 days.

(21) Appl. No.: 09/996,827

(22) Filed: Nov. 29, 2001

(65) Prior Publication Data

US 2002/0068105 A1 Jun. 6, 2002

(30) Foreign Application Priority Data

Dec. 4, 2000 (IT) ...................................... MI2000A2615

(51) Int. Cl.⁷ .............................................. B29C 44/20
(52) U.S. Cl. .................... 425/4 C; 425/133.5; 425/197; 425/203; 425/378.1; 425/462; 425/817 C
(58) Field of Search ............................. 425/4 C, 133.5, 425/197, 203, 204, 378.1, 462, 817 C

(56) References Cited

U.S. PATENT DOCUMENTS

| | | | | |
|---|---|---|---|---|
| 3,981,649 A | * | 9/1976 | Shimano et al. ............ | 425/4 C |
| 4,221,621 A | * | 9/1980 | Seki et al. ................ | 425/378.1 |
| 4,836,814 A | * | 6/1989 | Bambara et al. ........ | 425/817 C |
| 5,223,276 A | * | 6/1993 | Djordjevic et al. ......... | 425/462 |
| 5,780,067 A | * | 7/1998 | Herrington, Jr. ......... | 425/133.5 |
| 5,916,503 A | * | 6/1999 | Rettenbacher .............. | 425/4 C |
| 6,113,374 A | * | 9/2000 | Brackman et al. .......... | 425/4 C |
| 6,206,558 B1 | * | 3/2001 | Beckwith .................... | 425/4 C |
| 6,435,853 B1 | * | 8/2002 | Teraoka et al. ............. | 425/4 C |

* cited by examiner

Primary Examiner—Robert Davis
Assistant Examiner—Joseph S Del Sole
(74) Attorney, Agent, or Firm—Hedman & Costigan, P.C.

(57) ABSTRACT

Equipment for extruding an expanded polymer sheet or plate comprising an apparatus for the gravimetric loading (11) of a certain number of component polymers and/or mineral fillers, an extruding apparatus (17) consisting of a thermally controlled co-rotating twin-screw extruder (20) with a length ratio of at least 1/34 diameters, a loading pump (38) downstream of the extrusion apparatus, a static group (41) for the mixing and thermal conditioning of the mixture pumped, inserted in a thermo-regulated cartridge (42), a stratifier (44, 45) and a flat head (43), wherein, in at least one portion of the extrusion apparatus (17), there is an injection zone (29, 32) into which gas, such as $CO_2$, coming from a container tank (30, 34), is introduced.

7 Claims, 4 Drawing Sheets

EQUIPMENT FOR EXTRUDING AN EXPANDED POLYMER SHEET OR PLATE

BACKGROUND OF THE INVENTION

1. Field of the Invention

The present invention relates to equipment for extruding an expanded polymer sheet or plate, in particular polypropylene.

2. Description of Related Art

In the production field of expanded polymer products in the form of sheets or plates, in particular polypropylene, the equipment so far adopted does not allow an end-product to be obtained, with good resistance properties and at a low cost.

It should, in fact, be noted that polymers in general, and in particular polypropylene, have characteristics which do not allow easy expansion. Polypropylene in fact, in the molten state, at its characteristic Theological temperature, has a fluidity which is such that the action of gases, which tend to expand the cells, causes its structure to collapse.

It should also be considered that a polymeric material, such as polypropylene, is requested for its low cost and good mechanical and thermal resistance properties, and consequently, once expanded, has evident economic, ecological and technical advantages.

In this respect, methods are known which, by means of an extrusion process, allow this polymer to be chemically expanded with the sole use of particular chemical expanding agents. Chemical expanding agents however, whose use is necessary for this purpose with percentages equal to 2–6% with respect to the polymer, i.e. polypropylene, are of no economic advantage as they are considerably costly.

Furthermore, the use of physical gases is known, which are injected into the polymer, for example polypropylene, by means of injection processes, which do not allow an economically product to be obtained.

SUMMARY OF THE INVENTION

An objective of the present invention is to attempt to produce equipment for the extrusion of expanded polymers in sheets or plates, in particular expanded polypropylene, at reduced costs and with a high performance of the product obtained.

Another objective is to produce equipment for the extrusion of expanded polypropylene in sheets or plates, which is safe and ecologically valid, also in the presence of an expansion gas such as $CO_2$.

These objectives according to the present invention are reached by the production of equipment for extruding an expanded polymer sheet or plate, in particular expanded propylene, as described in detail in claim 1.

Further characteristics are illustrated in the dependant claims.

BRIEF DESCRIPTION OF THE DRAWINGS

The characteristics and advantages of the equipment for extruding an expanded polymer sheet or plate, such as expanded polypropylene, according to the present invention, can be more clearly understood from the following description, which is illustrative but non-limiting, referring to the enclosed schematic drawings in which.

DETAILED DESCRIPTION OF THE INVENTION

Figure 1A:
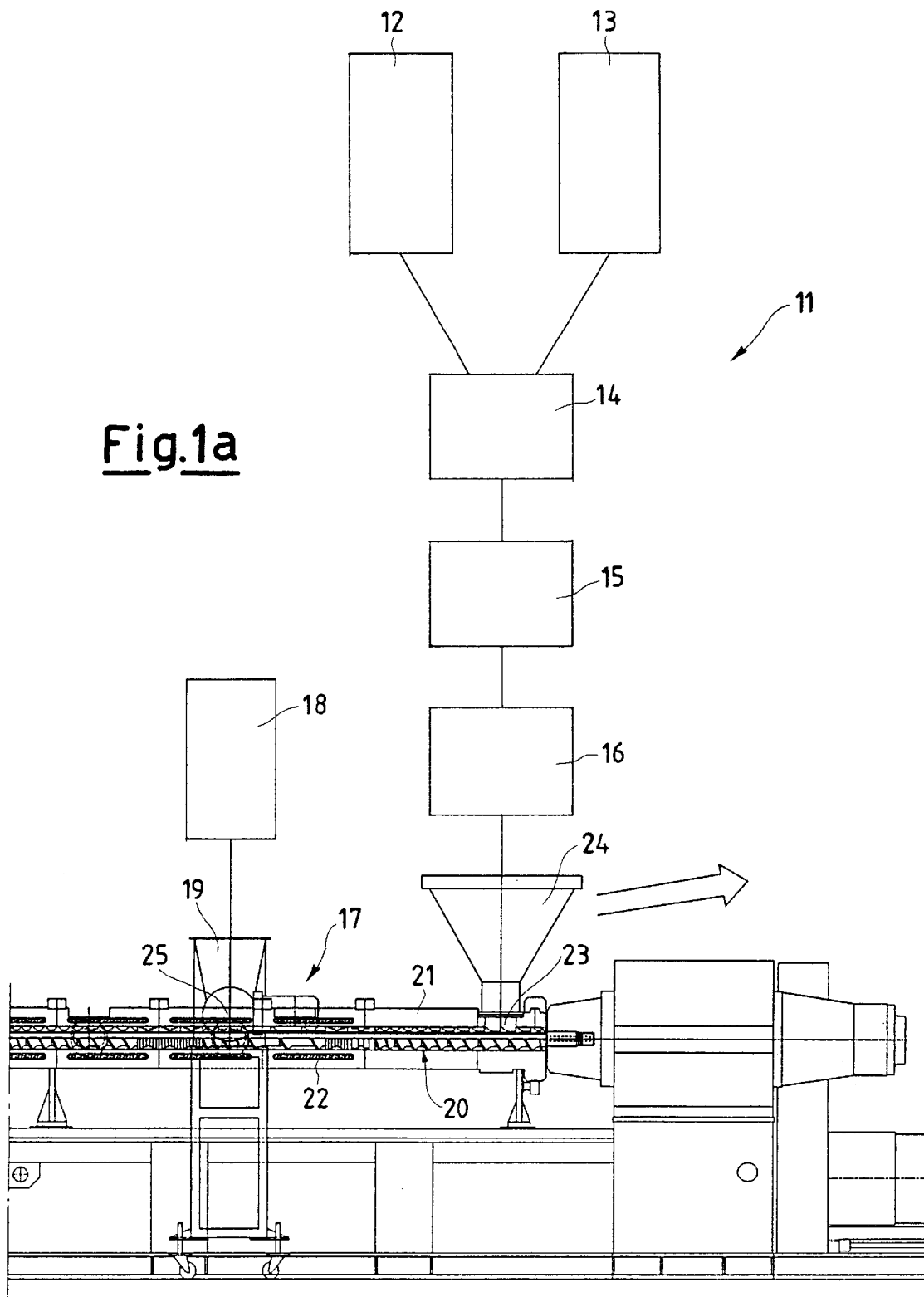
FIGS. 1a and 1b are schematic elevation views which illustrate the equipment as a whole for extruding an expanded polypropylene sheet or plate according to the invention.
Figure 1B:
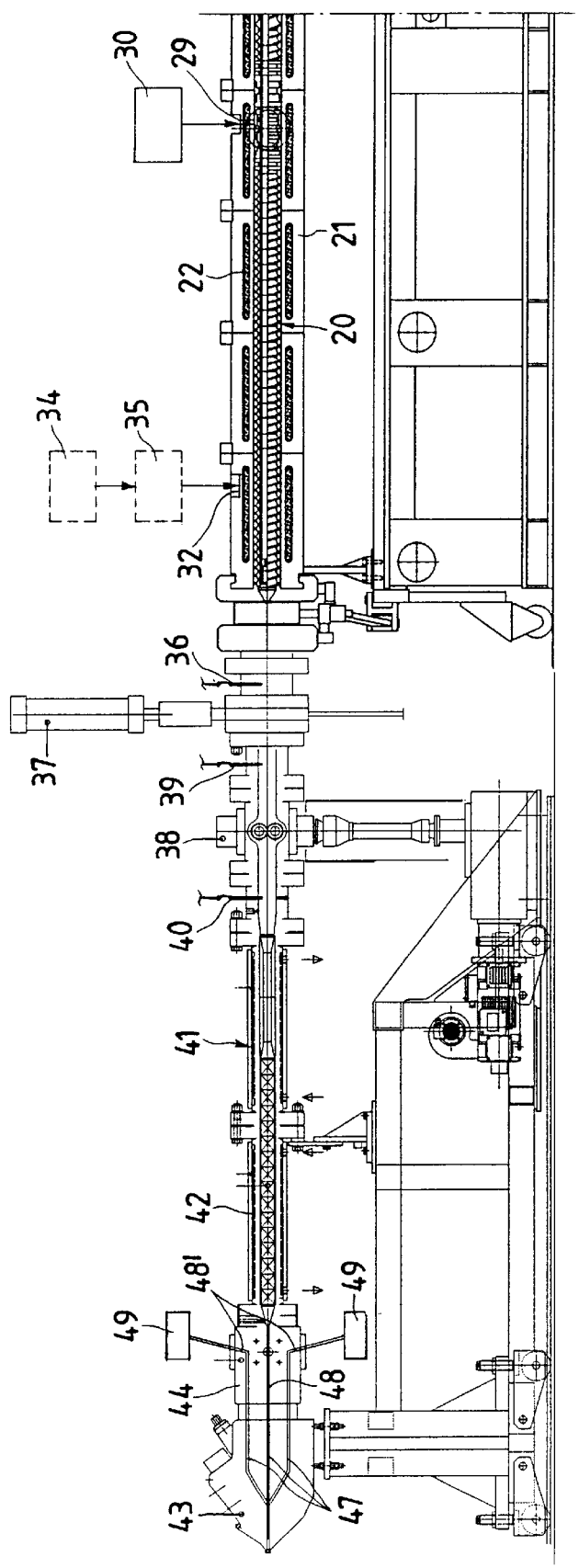
Figure 3:
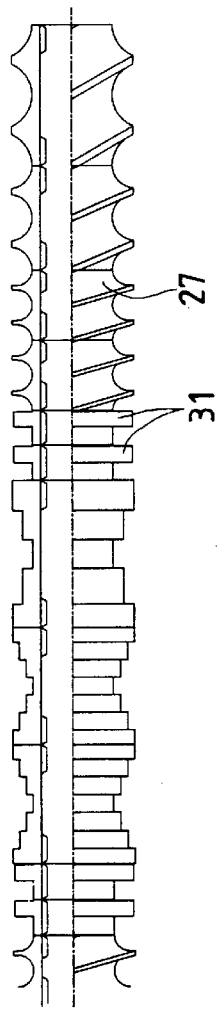
FIG. 3 is an enlarged sectional detail of a special device on the screw for preventing the return of gas towards the polymer feeding.

With reference to FIGS. 1a and 1b, these illustrate the equipment for extruding an expanded polymer sheet or plate, in particular expanded polypropylene, according to the invention in one of its embodiments.

The equipment comprises an apparatus for the gravimetric loading 11 of a certain number of components, such as various types of polymer, for example polypropylene, mineral fillers or others. This apparatus 11 comprises at least one pair of loading trays 12, 13 for different types of polymers, such as polypropylene, associated with a loading unit 14 which functions with a "weight sum" logic.

The formulation thus obtained is homogenized in a special mixer 15 which in turn feeds the mixture thus obtained to a gravimetric loading tray 16, functioning with a "loss in weight" logic, which feeds an extrusion apparatus 17, in a so-called "hungry mouth" form. In addition, mineral fillers, coming from a further gravimetric loading tray 18, functioning with a "loss in weight" logic, are injected into an intermediate zone of said apparatus, said loading tray constantly feeding a metering screw 19 associated with the extrusion apparatus 17.

The extrusion apparatus 17 consists of a co-rotating twin-screw extruder 20 with a length ratio of 1/34 diameters. The casing or cylinder 21 of this extruder is thermally controlled in 8 separate zones by diathermic oil circulating in chambers 22.

Figure 2:
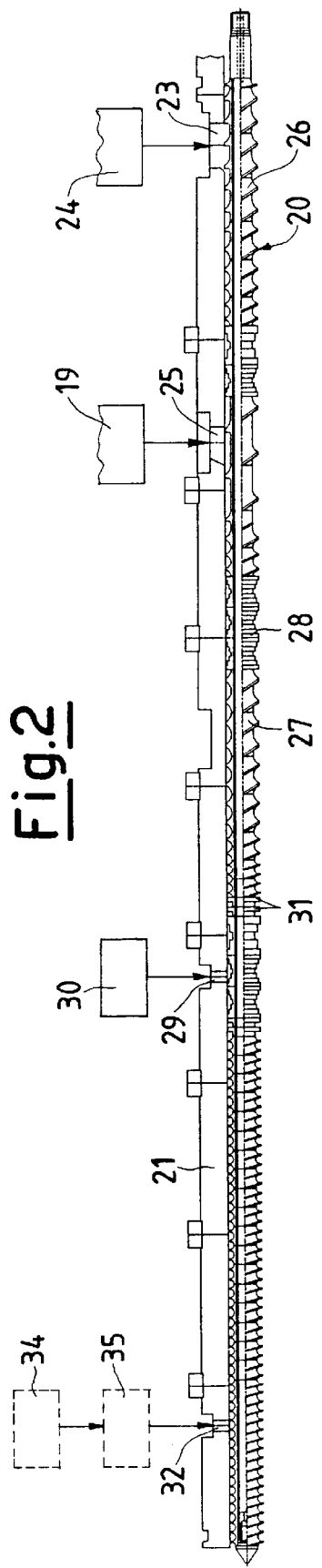
FIG. 2 is an enlarged section of half of a co-rotating twin-screw extruder which forms part of the equipment of FIG. 1.

FIG. 2 shows the co-rotating twin-screw extruder 20 subdivisible into a series of parts.

There is, in fact, a feeding 23 in line with a hopper 24 which receives the dosed mixture of polypropylene. Immediately downstream of this first feeding 23, there is a second feeding 25 into which the mineral filler coming from the metering screw 19 is charged. The melting of the polymers fed through the mixture takes place in a portion 26 of the extruder situated between the two feedings 23 and 25.

The mixing of the polymers and filler is effected in a subsequent portion 27 of the extruder, due to the presence of specific cams, schematized in 28.

According to the present invention, there is also an injection zone 29 into which gas, for example $CO_2$ coming from a container tank 30, is introduced.

In order to prevent the return of the gas towards the feeding of polymers and filler, sealing elements 31, in the form of rings, are arranged on the pair of screws.

When volatile $CO_2$ is to be injected into the injection zone under vacuum 29, the sealing elements 31 are installed. These, together with the cylinder 21 of the extruder, create a narrow gap within which the mixture is under pressure; as the zone immediately subsequent to this, into which the volatile gas is injected, is under vacuum, the gas is only able to move forwards and not backwards.

As the gas, for example $CO_2$, is in a gaseous state, its pressure is regulated by means of a specific regulator and the gas flow-rate is in relation to the volume occupied by the polymeric mixture in the vacuum zone 29. For example, in the presence of a greater free volume from the mixture in the vacuum zone, and a higher number of screw revs, there will be a higher gas consumption. The operating pressure, with this system, ranges on an average from 8 to 15 bars.

The polymeric mixture and gas are subsequently transferred from the zone 29 to another zone 32 which compresses the mixture both as a result of the change in section and also because, in that particular zone of the extruder, there is a sudden temperature drop. The gas becomes increasingly more compressed and micronized in the polymeric mixture.

Figure 4:
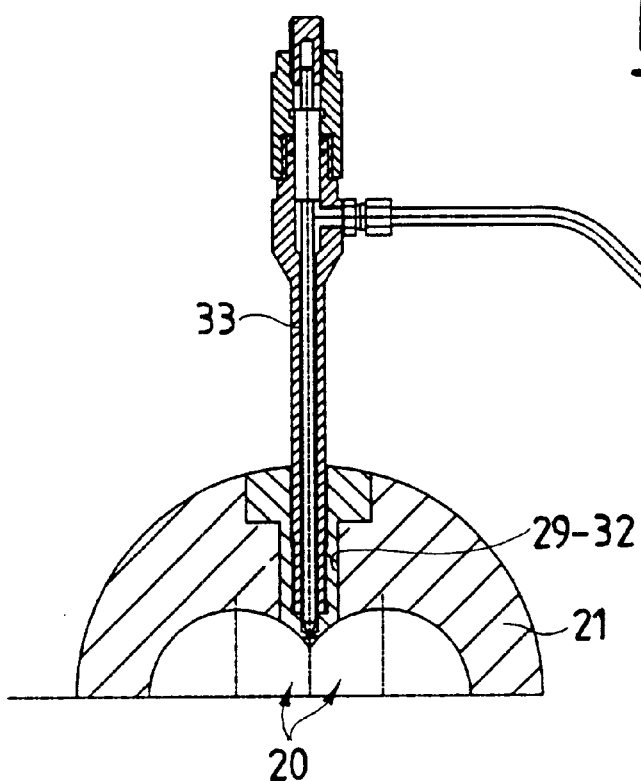
FIG. 4 is a partial cross section of an injector positioned along the twin-screw extruder.

FIG. 4 illustrates an injecting device 33 positionable in correspondence with the vacuum zone 29 for the feeding of the gas contained in the tank 30.

Alternatively, it is possible to inject the gas into the zone 32 under pressure. In this case, it should be noted that the $CO_2$, in liquid form, comes from a specific container tank 34 with a plunged pipe in the liquid zone; it is cooled to a temperature of $-5°$ C. and injected into the molten mass of material in the liquid state, with a special pump, schematized in 35, for example the one commercialized by LEWA. The particular characteristic of this pump is that it doses gas in regular quantities and at a pressure higher than that of the mixture in the feeding. Also in this case, sealing elements 31 are necessary, and the gas can be fed with a nozzle 33 completely analogous to that illustrated in FIG. 4.

At the outlet of the extrusion apparatus, there is a control group 36 for both the temperature and pressure of the mixed mass before this is passed into a filter (not shown) associated with a filter changer 37. This is a device which in extrusion is suitable for filtering the polymeric mixture by retaining all foreign bodies. It generally has interchangeable filtering plates whose function is to protect mechanical units.

Before the mixture is charged into a loading pump 38, there is a control group 39 of the intake pressure of the pump 38. Similarly, at the pump outlet, there is a control group 40 of the discharged pressure.

A pump with modular gears, motorized with a direct current gearmotor, is generally used. The function of this pump is to push, by means of the subsequent static mixers, stratifier and extrusion flat head, the mixture which, as already mentioned, has an ever-increasing viscosity due to its cooling. Both the intake and discharge pressures are controlled. In particular the intake pressure interacts with the gravimetric loading trays 12 and 13 to ensure that there is always a set pressure which favours a constant expansion of the product.

The mixture thus obtained is then pumped inside a static group 41 for the mixing and thermal conditioning of the mixture.

The static group 41 consists of a series of static mixers inserted in an oil thermoregulated cartridge 42. These mixers are specifically calculated to obtain a high pressure drop so that the thrust load of the pump 38 is never lower than 350–400 bars. It can also be noted that a stratifier and extrusion flat head, situated at the end of the equipment, also contribute to creating this pressure. The thermoregulation of the cartridge mentioned above is obtained by means of a specific oil system (not shown). In the mixer, the mixing of the mixture/gas takes place in an ideal hyper-critical state (see Henry's law) for the polypropylene which becomes increasingly more viscous.

Associated with the static group 41, there is a stratifier connected in turn to an extrusion flat head 43.

Figure 5:
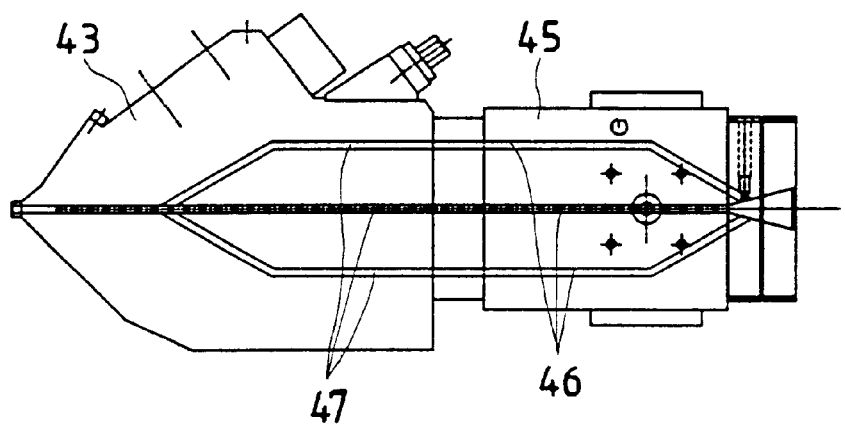
FIG. 5 is a section of the end part alone of the equipment in an alternative form.

In the embodiment illustrated, two types of stratifier 44 and 45 can be used alternatively for the feeding of the mixture to the head 43. A first embodiment, illustrated in FIG. 5, comprises a stratifier 45 which separates the mixture coming from the static group 41 into three channels 46 which then feed the channels 47 of the flat head 43.

Alternatively, there can be a stratifier 44 which feeds the three channels 47 of the extrusion flat head with a channel 48, coming directly from the static group 41 and therefore from the extruder 17, and with a further two co-extruders schematized in 49 which feed two channels 48' connected to the remaining channels 47 of the flat head 43.

In the example described and illustrated, there is an oil-thermoregulated flat head 43 with three separate channels, but alternatively an annular head (not shown) may be associated with the equipment of the invention.

It can therefore be seen how, according to the invention, an set of equipment is produced which allows the extrusion of a sheet or plate of an expanded polymer, in particular polypropylene.

Similarly, it is therefore possible to obtain end-products which can be used in various fields such as the car industry (internal door linings), for food packaging, fruit containers, etc.

It should be noted that the gas $CO_2$ is preferred as it can be handled without danger, is ecologically more valid than other gases as it is a re-used natural source, produced without any kind of burning and is inexpensive; it also seems to be the most suitable gas for a non-violent expansion.

Another important recommendation is to lower the temperature of the molten mixture as much as possible, immediately after injecting the gas, in order to increase its viscosity to favour the physical phenomenon called Henry's Law (according to which the solvency of gases in solids is proportional to the pressure exerted) and to further facilitate a limited collapse. For example, the temperature in question should be slightly higher than the melting point of the polymer (in the case of polypropylene 160° C.).

The end-products thus obtained can be mono-extruded laminates in a completely expanded single layer, or co-extruded laminates with the help of other co-extruders, as illustrated in FIG. 1b. Any possible non-expanded layers will consist of compatible materials.

In addition to being expanded, the internal structure can, if necessary, be loaded with mineral fillers, such as $CaCO_3$, talc, etc. which can serve to increase the rigidity, favour expansion as nucleating agents and reduce costs.

What is claimed is:

1. Equipment for extruding an expanded polymer sheet or plate characterized in that it comprises a first apparatus for the gravimetric loading (11) of a certain number of component polymers, a second apparatus (18, 19, 25) for the gravimetric loading of fillers, an extrusion apparatus (17) consisting of a thermally controlled co-rotating twin-screw extruder (20), with a length ratio of at least 1/34 diameters, a loading pump (38) downstream of said extrusion apparatus, a static group (41) for the mixing and thermal conditioning of the mixture pumped, inserted in a thermoregulated cartridge (42), a stratifier (44, 45) and a thermoregulated flat head (43) connected to a downstream portion of said stratifier and positioned at the outlet end of said equipment, wherein, in at least one portion of the extrusion apparatus (17), there is an injection zone (29, 32) into which gas coming from a container tank (30, 34), is introduced.

2. The equipment according to claim 1, characterized in that said injection zone is an injection zone under vacuum

(29) of said extrusion apparatus (17) in which sealing elements (31) are assembled on said co-rotating twin-screw extruder (20), which create, with an external cylindrical casing (21), a narrow gap inside which there is mixture under pressure so that said gas injected in volatile form cannot flow backwards.

3. The equipment according to claim 1, characterized in that said injection zone is an injection zone under pressure (32) in which said gas in liquid form, coming from a specific cooled container tank (34), is injected into the molten mass of material by means of a pump (35) and a relative injector (33).

4. The equipment according to claim 1, characterized in that said stratifier is a stratifier (44) which separates the mixture coming from said static group (41) into several channels (46) which feed channels (47) of said thermoregulated flat head (43).

5. The equipment according to claim 1, characterized in that said stratifier is a stratifier (44) which feeds three channels (47) of the flat head (43) with a channel (48), coming from said static group (41), and with a further two co-extruders (49) which feed two channels (48') connected to the remaining channels (47) of the thermoregulated flat head (43).

6. The equipment according to claim 1, characterized in that between said extrusion apparatus (17) and said static group (41) there are a control group 36 of both the temperature and pressure of the mixed mass before the same is passed inside a filter of a filter changer (37), a control group (39) of the intake pressure of the pump (38), arranged downstream of said filter changer (37), and a control group (40) of the discharge pressure at the outlet of the pump (38).

7. The equipment according to claim 1, characterized in that both said extrusion apparatus (17) and said static group (41) are thermoregulated by means of chambers (22) in which diathermic oil circulates.

* * * * *